(No Model.) 2 Sheets—Sheet 1.

J. COYLE.
INSERTIBLE TOOTH SAW.

No. 579,383. Patented Mar. 23, 1897.

WITNESSES:
Horace B. Jones
Jula Green

INVENTOR
John Coyle,
BY
V. H. Lockwood,
His ATTORNEY.

THE NORRIS PETERS CO., PHOTO-LITHO., WASHINGTON, D. C.

(No Model.) 2 Sheets—Sheet 2.

J. COYLE.
INSERTIBLE TOOTH SAW.

No. 579,383. Patented Mar. 23, 1897.

WITNESSES
Horace B Jones
Zula Green

INVENTOR
John Coyle
BY
V H Lockwood
His ATTORNEY.

UNITED STATES PATENT OFFICE.

JOHN COYLE, OF INDIANAPOLIS, INDIANA.

INSERTIBLE-TOOTH SAW.

SPECIFICATION forming part of Letters Patent No. 579,383, dated March 23, 1897.

Application filed October 10, 1896. Serial No. 608,533. (No model.)

*To all whom it may concern:*

Be it known that I, JOHN COYLE, of Indianapolis, county of Marion, and State of Indiana, have invented a certain new and useful Insertible-Tooth Saw; and I do hereby declare that the following is a full, clear, and exact description thereof, reference being had to the accompanying drawings, in which like numerals refer to like parts.

My invention relates to an insertible-tooth saw that is strong and durable, economical in construction, and convenient to insert the tooth or detach it from the saw. This insertible tooth is well adapted for all kinds of saws, especially for band-saws. Furthermore, the teeth may be placed closer together than any insertible teeth of which I am aware.

The full nature of my invention will appear from the accompanying drawings and the description and claims following.

Figure 1:
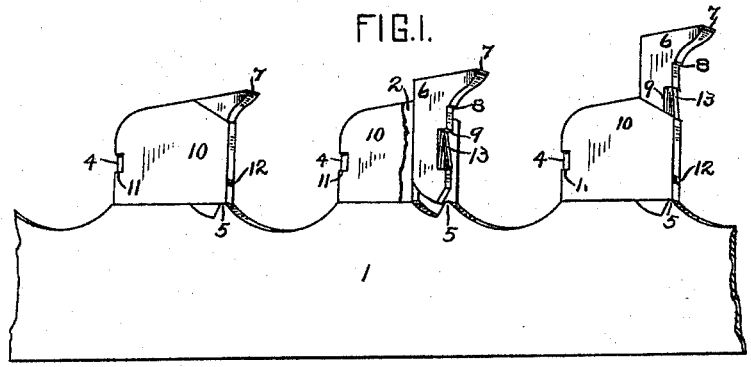
Figure 2:
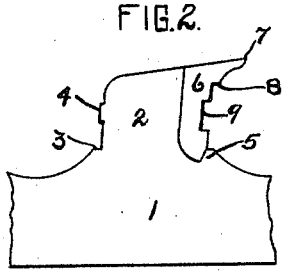
Figure 3:
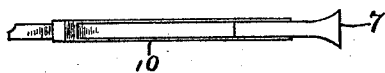
Figure 4:
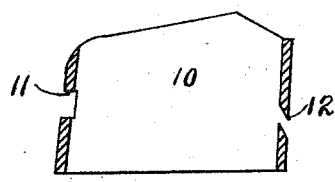
Figure 6:
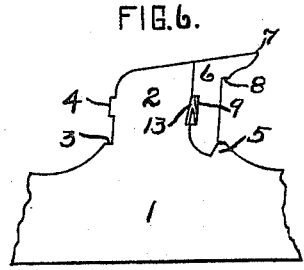
Figure 5:
Figure 7:
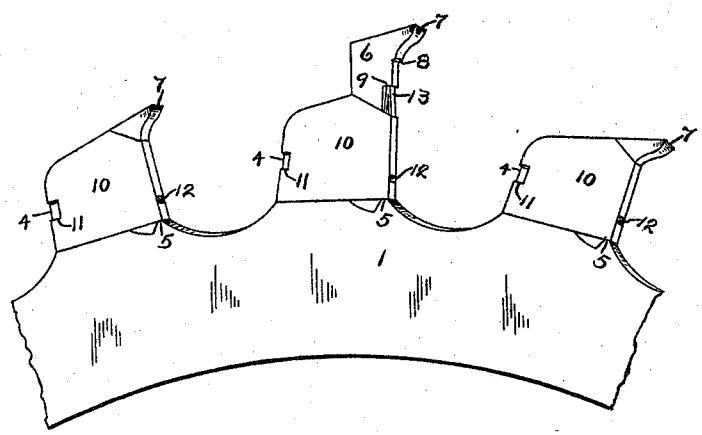

In the drawings, Figure 1 is a perspective of a section of a band-saw with one tooth in place and two others in the process of insertion. Fig. 2 is a side elevation of a tooth and a section of the blade, the other parts being removed. Fig. 3 is a plan view of a section of the saw, showing the teeth and sleeve in place, the parts being on a scale double that of the prior figures. Fig. 4 is a longitudinal vertical section of the sleeve, it being shown on a scale double that of Figs. 1 and 2. Fig. 5 is a detail view of the spring. Fig. 6 is a side elevation of a tooth and a section of the blade with the spring located in the rear of the tooth instead of the front portion thereof. Fig. 7 is a side elevation of a section of a circular saw provided with my insertible teeth.

In the saw shown, 1 is the blade with the projection 2 extending upwardly therefrom. The projections are longer at the front or right-hand portion than at the rear or left-hand portion, the top sloping slightly to the rear. The front upper corner is angular, the angle being slightly less than a right angle, although this is not necessary. The rear upper corner is preferably curved. The front face is inclined slightly forward from a line perpendicular to the blade. The rear face inclines the same way, but to a slightly greater extent, so that the width of the projection at its upper end is slightly less than the width at the lower end. The rear face of the projection is inclined, as described, and the upper rear corner is curved in order that the throat between the teeth may be large enough to permit the free escape of sawdust from between them. At the base of the lower portion of the projection I provide a square seat or shoulder 3. At some point on the rear face of the projection I provide a lug 4. The function of these will appear hereinafter. At the base of the front portion of the projection I provide a recess between the projection and the extension or lug 5. The thickness of the projection 2 is substantially the same as that of the body of the blade.

The tooth 6 is formed with a widened cutting edge 7, having a shank whose rear face is parallel with the front face of the projection 2, so that when the tooth is inserted it will bear for its full length against the front face of the projection. The lower end of the shank of the tooth is formed to fit snugly in the recess between the projection 2 and the extension or lug 5. By this arrangement it is observed that when the point of the tooth is subjected to pressure during the work the resistance is received by the upper front portion of the projection 2, and the tendency of the lower end of the shank of the tooth to move or kick forward during the work is prevented by the extension or lug 5. The rear face of the extension or lug 5 is preferably a straight line inclined downwardly to the rear or left hand. The engaging face of the shank of the tooth is formed to correspond. The upper face of the extension or lug 5 is preferably flat, and likewise the tooth has a shoulder 8 below and to the rear of the point thereof. The front face of the tooth, as shown in Figs. 1 and 2, is provided with a recess 9. The function of these last-mentioned parts will hereinafter appear. The thickness of the teeth is the same as that of the blade and projection 2, excepting at the point, which is widened, as shown in Fig. 3.

The tooth is held in place from lateral movement by a sleeve 10, made of steel and very thin along its sides, although the front and rear faces are preferably made thicker. Before the tooth is inserted the sleeve is placed over the projection 2. If desired, the sleeve may be made wider at the bottom than at the top. In the rear portion of the sleeve I provide a recess or notch 11 to engage the lug 4 on the projection 2. It is made higher or lower, according to the choice of the manufacturer, the purpose being to prevent the elevation or escape of the sleeve after the tooth has been inserted. The sleeve fits snugly on the shoulder 3 at the rear of the projection 2 and on the flattened end of the extension or lug 5. The sleeve is preferably made so that its rear and upper portions will conform to and be flush with the faces of the projection 2. The front portion of the sleeve extends sufficiently far beyond the front face of the projection 2 to provide a seat or space for the insertion of the tooth 6. The front face of the sleeve has a notch or oblique slot 12, as shown in Fig. 4, the purpose of which will hereinafter appear.

After the sleeve has been placed on the projection 2 the tooth is inserted. I place an inverted-V-shaped spring 13 in a recess or cut-out portion 9, to be found in the front face of the shank of the tooth 6. It occupies the position shown in the tooth at the right hand in Fig. 1. The two arms of the spring are compressed by a suitable tool until they lie flat together, and then the tooth is forced down into the sleeve, with the cut ends of the spring extending downward, as shown in the middle tooth in Fig. 1. When the tooth is forced to its lowest position, the outer or free arm of the spring 13 will naturally enter the inclined slot 12. The nature of the bearing of the free end of the spring 13 against the inclined face on the upper side of the slot will tend to hold the tooth down into position and tend to prevent its escape upward, yet it is of such nature that when the tooth is desired to be drawn it can be readily accomplished by pincers or tongs, and this is true although the tooth rusts or something else may tend to hold the tooth in its place. For this reason the spring is of such nature as to render the removal possibly easier than the insertion of the tooth. The shoulder 8 of the tooth fits snugly down on the front face of the sleeve.

It is observed that because the thickness of the sleeve is very slight on its sides it is not subjected to wear, because of the much greater width of the cutting-point of the tooth. The front face of the sleeve is preferably made thicker, as it receives some wear from the sawdust. Likewise, the rear face of the sleeve may be made thicker for additional strength, for the strain on the sleeve is chiefly longitudinal. By reason of the snug fit of the sleeve about the projection 2 the sidewise strain on the sleeve is not great, so that a sleeve sufficiently thin not to contact with the wood during the sawing process will be amply strong to prevent the lateral movement of the tooth.

A slightly-modified form is shown in Fig. 6, the only difference being that the spring 13 is located in the rear of the shank of the tooth instead of in the front portion thereof, and instead of there being an inclined slot in the front face of the sleeve an inclined notch or groove is made in the front face of the projection 2. Fig. 7 shows a circular saw provided with my insertible tooth, the construction being substantially the same as that in the band-saw.

What I claim as my invention, and desire to secure by Letters Patent, is—

1. In a saw, a projection from the blade thereof, an insertible tooth, and a sleeve that surrounds the projection and tooth to hold the latter in place.

2. In a saw, a projection from the blade thereof, an insertible tooth, a sleeve that surrounds the projection and tooth to hold the latter in place, and means for holding such sleeve on the projection.

3. In a saw, a projection from the blade whose front face is inclined forward to the free end thereof, an insertible tooth that fits snugly against the front face of such projection, and a sleeve that surrounds such projection and tooth to hold the latter in place.

4. In a saw, a projection from the blade thereof, a slight extension or lug from the blade forming a recess between such projection and lug, a tooth whose shank is formed to fit in such recess and against the projection, and a sleeve that surrounds the projection and tooth to hold the latter in place.

5. In a saw, a projection from the blade thereof provided with a lug on its rear face, a tooth that fits against the front face of such projection, and a sleeve which surrounds such projection and tooth and has a notch in its rear face to engage the lug on the projection to prevent the escape of the sleeve.

6. In a saw, a projection from the blade thereof provided with a flat shoulder near the base of its rear face and with a lug in its rear face, a slight extension or lug on the blade with straight upper and rear faces and forming a recess between it and the base of the projection, a tooth whose shank at its lower end is formed to fit snugly in such recess and having a shoulder in the upper portion of its front face, and a sleeve surrounding such projection and tooth provided with a notch in its rear portion to engage the lug on the rear of the projection to prevent the escape of the sleeve.

7. In a saw, a projection from the blade thereof, a tooth provided with a recess in its shank, a spring fitting in such recess and adapted to press against an adjacent surface, and a sleeve that surrounds such projection and tooth.

8. In a saw, a projection from the blade thereof, a tooth provided with a recess in its front face, an inverted-V-shaped spring with one arm fitting in such recess in the tooth and its free end extending downward, and a sleeve that surrounds such projection and tooth and has a slot or notch in its front face into which the free arm of such spring may extend when the tooth is in place.

In witness whereof I have hereunto set my hand this 23d day of September, 1896.

JOHN COYLE.

Witnesses:
V. H. LOCKWOOD,
ZULA GREEN.